United States Patent [19]
Farrington

[11] 3,759,229
[45] Sept. 18, 1973

[54] DEBEAKING, VACCINATING AND CULLING WHEEL AND PANEL FOR POULTRY

[76] Inventor: Floyd G. Farrington, Rt. 2, Box 142, San Angelo, Tex. 76901

[22] Filed: May 19, 1972

[21] Appl. No.: 255,102

[52] U.S. Cl............................................. 119/97 R
[51] Int. Cl............................................. A01k 37/00
[58] Field of Search..................... 119/97 R; 17/11.2

[56] References Cited
UNITED STATES PATENTS

| 2,713,325 | 7/1955 | Bowers | 119/97 R |
| 2,710,985 | 6/1955 | Zebarth | 17/11.2 |
| 2,485,929 | 10/1949 | Siegrist | 119/97 R |

Primary Examiner—Hugh R. Chamblee
Attorney—Hyman Berman et al.

[57] ABSTRACT

A device for debeaking, vaccinating, grading or otherwise processing live poultry consisting of a fenced enclosure with a horizontal rotary wheel having hooks on which the poultry can be secured. One panel of the enclosure has an inverted U-shaped slot through which the wheel can be passed and the wheel has an axial journal support located so that a portion of the wheel extends outwardly through the slot and so that poultry hooked on the wheel in the enclosure can be turned to a position outside the enclosure for treatment.

8 Claims, 6 Drawing Figures

DEBEAKING, VACCINATING AND CULLING WHEEL AND PANEL FOR POULTRY

This invention relates to animal husbandry devices and more particularly to a device for debeaking, vaccinating, grading, or otherwise processing live poultry, such as chickens, turkeys, and the like.

A main object of the invention is to provide a novel and improved device to speed up the process of debeaking, vaccinating, culling, or other treatments of live poultry, the device being relatively simple in construction, being easy to operate, and greatly facilitating the processing of poultry, such as debeaking, vaccinating, and the like.

A further object of the invention is to provide an imporved device for processing live poultry, such as pullets, young turkeys, or the like, the device being inexpensive to fabricate, being durable in construction, being easy to set up for use, and making it possible to rapidly process poultry employing a minimum number of operators, thereby providing a considerable saving in the cost of such processing.

Further objects and advantages of the invention will become apparent from the following description and claims, and from the accompanying drawings, wherein:

Figure 1:
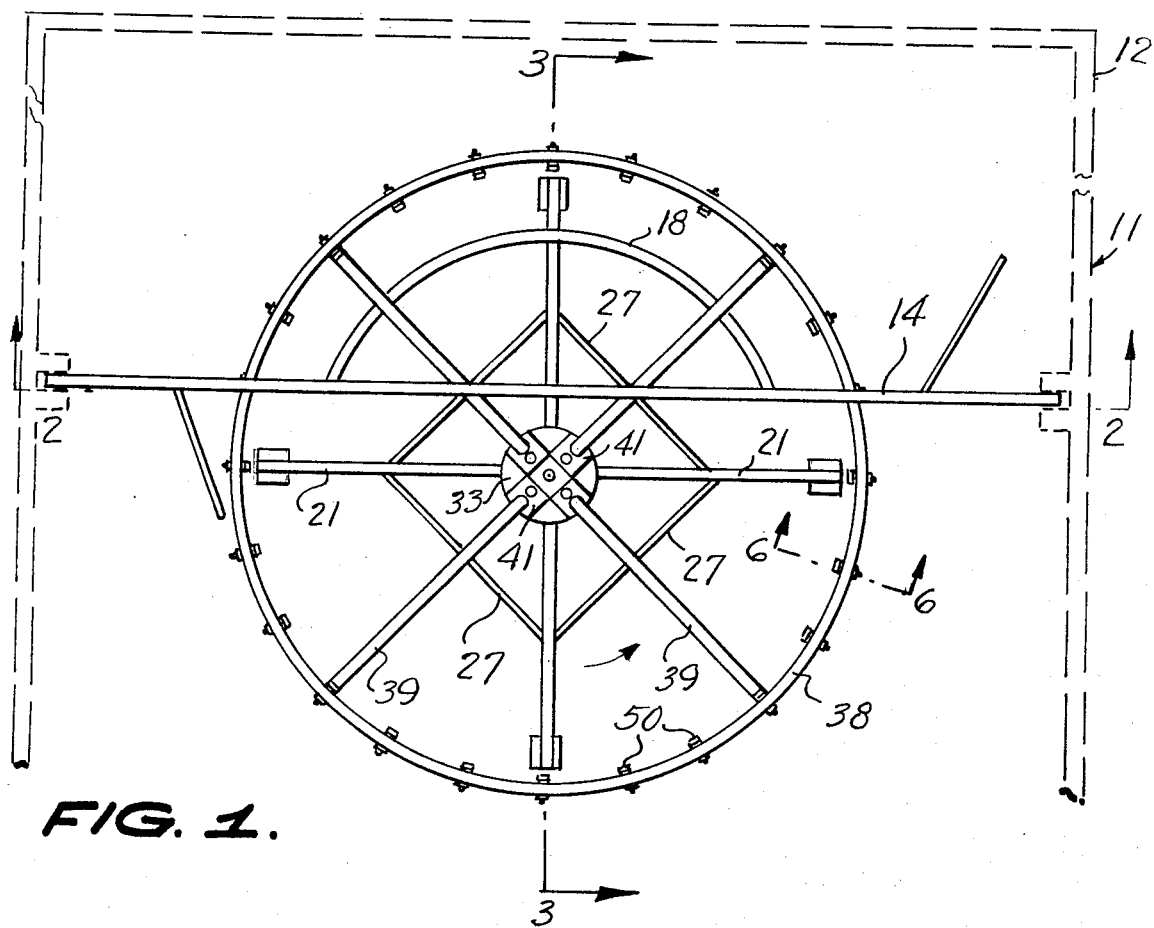
FIG. 1 is a top plan view of an improved device for processing live poultry constructed in accordance with the present invention.

A primary purpose of the present invention is to provide a means for speeding up processing of poultry, such as the debeaking, vaccination and other treatments of pullets or similar young poultry which must be treated at ages from approximately 12 to 20 weeks old.

Referring to the drawings, 11 generally designates an improved device for treating live poultry in accordance with the present invention. The device 11 comprises a fenced enclosure, designated generally at 12, of sufficient size to accommodate a substantial number of young pullets; for example, 200 to 250 young pullets, together with at least two workers. The enclosure may be constructed of conventional material; for example, of standard chicken wire 13 supported on suitable rigid framework elements defining panels which are assembled to form the enclosure. The enclosure includes a front panel 14 formed with an inverted U-shaped slot having the horizontal top portion 15 located in the upper portion of panel 14 and having the relatively wide vertical end portions 16 and 17. Below the horizontal top portion 15 of the slot the front panel 14 is formed with an inwardly projecting arcuate wall portion 18 which is substantially centered below the horizontal top portion 15 of the inverted U-shaped slot.

Figure 4:
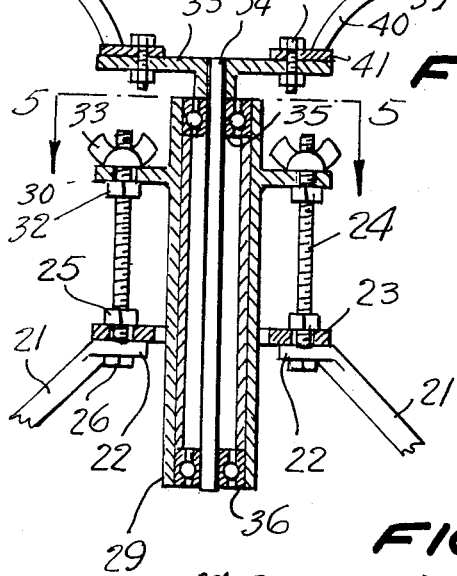
FIG. 4 is an enlarged fragmentary vertical cross-sectional view taken substantially on the line 4—4 of FIG. 3.
Figure 5:
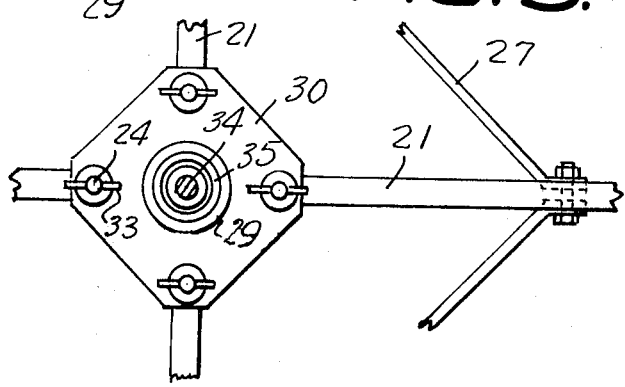
FIG. 5 is a fragmentary horizontal cross-sectional view taken substantially on the line 5—5 of FIG. 4.

Mounted outwardly adjacent the inverted U-shaped slot of the inwardly projecting arcuate wall portion 18 is an upstanding frame 20 comprising a plurality of upwardly and inwardly convergent leg elements 21 whose top ends comprise horizontal flanges 22 which extend inwardly and on which is mounted a centrally apertured plate member 23 which is rigidly connected to the flanges 22 by upstanding vertical bolts 24, the bolts passing through the flanges 22 and apertures provided in the plate 23, and the plate being clamped to the flanges 22 by nuts 25 on the bolts 24 which clamp the plate 23 between the flanges 22 and the nuts 25 with the heads 26 of the bolts located beneath the flanges, as shown in FIG. 4. The intermediate portions of the leg elements 21 are connected by tie bars 27 so as to rigidify the frame.

Designated at 29 is a vertical bearing sleeve extending through the central aperture of plate 23 and provided with a substantially square flange 30 at its upper portion, the flange 30 being provided with corner apertures which receive upstanding bolts 24, the flange being adjustably secured to the bolts. Thus, the bolts are provided with nuts 32 threaded thereon below the flange member 30 and with wing nuts 33 above said flange member, whereby the flange member may be locked in an adjusted position on the bolts 24. A hub member 33 in the form of a circular disc has a depending vertical shaft 34 rigidly secured thereto which is journaled in the sleeve member 29 by a pair of conventional ball bearing units 35 and 36 provided respectively in the top and bottom ends of the sleeve member 29.

Designated at 38 is a circular ring member which may be formed of tubular material and which is supportingly connected to the hub member 33 by a plurality of radial spoke arms 39 which are provided with downwardly curved inner arcuate portions 40 welded to horizontal flange elements 41 which are secured to the hub disc 33 by fastening bolts 42, as shown in FIG. 4.

Figure 3:
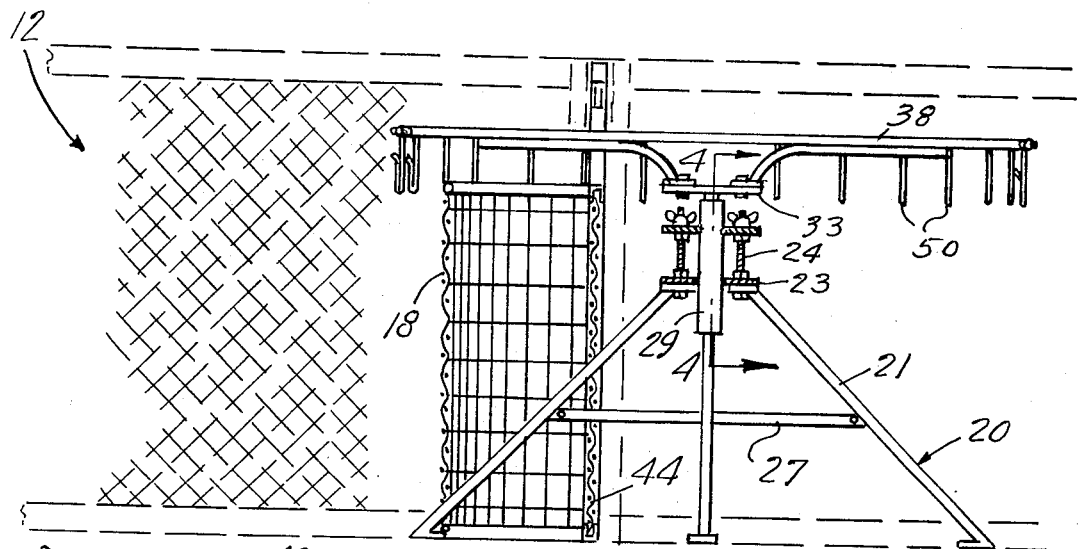
FIG. 3 is a transverse vertical cross-sectional view taken substantially on the line 3—3 of FIG. 1.

The panel 14 of the enclosure 12 is provided with a straight panel portion 44 which is secured across the inwardly projecting arcuately curved section 18. The arcuately curved panel section 18 is of a radius substantially smaller than the radius of the ring member 38, the frame 20 being so located that the ring member 38 is substantially concentric with the arcuate screen section 18 but projects inwardly thereof, as is clearly shown in FIG. 3.

Figure 2:
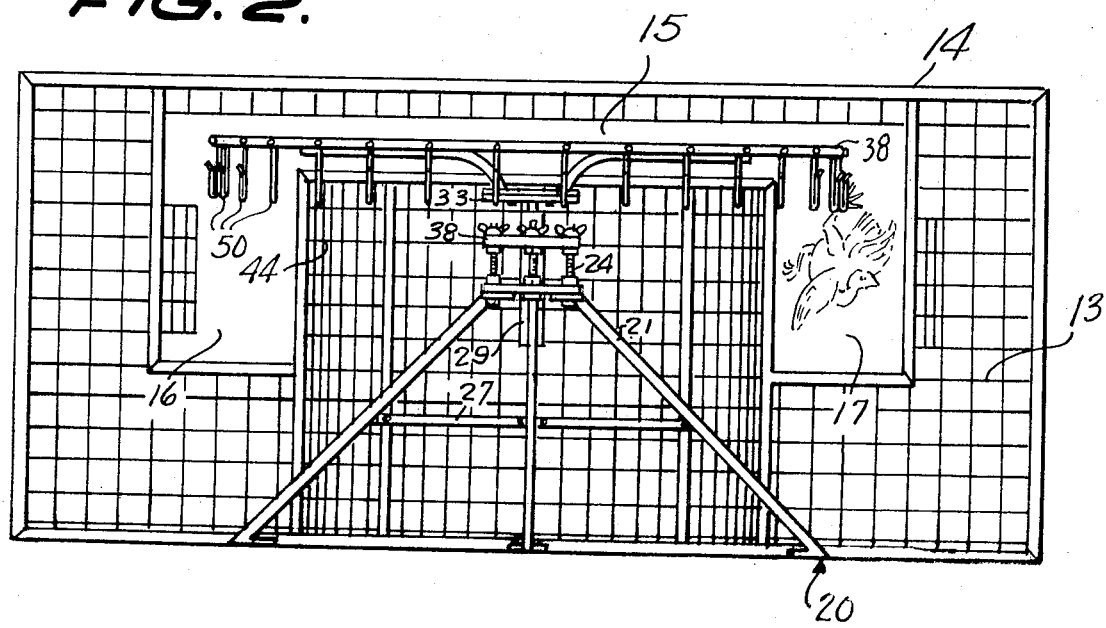
FIG. 2 is an elevational view taken substantially on the line 2—2 of FIG. 1.
Figure 6:
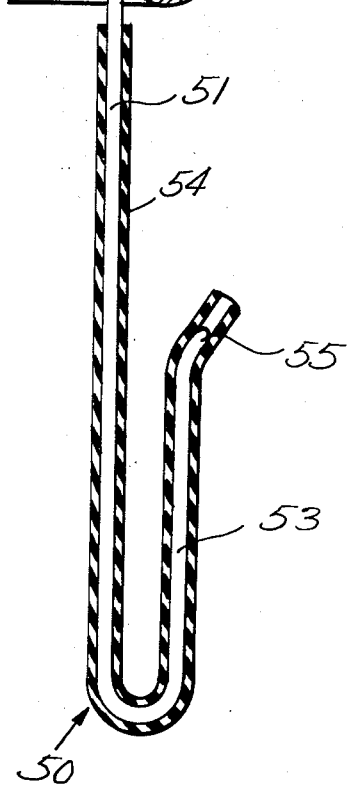
FIG. 6 is an enlarged vertical cross-sectional detailed view taken substantially on the line 6—6 of FIG. 1.

A plurality of hook assemblies 50 are secured at evenly spaced intervals to the ring member 38, the hook members 50 comprising shank portions 51 whose top ends are inwardly clamped to the ring element 38 by bolts 52, as shown in FIG. 6. The hook members have generally U-shaped bight portions 53 and are provided with resiliently deformable protection cover sleeves 54 of soft plastic, or the like. The bight portions 53 are each so formed as to define a vertically elongated space in which the leg of a young pullet or similar fowl may be engaged so as to suspend the fowl from the hook in the manner illustrated in FIG. 2, injury to the fowl being prevented by the provision of the soft resilient protective sleeve element 54 provided on the hook. The bight portions of the hooks are narrow enough to hold the leg portions of the pullets or other young poultry securely while they are suspended from the wheel. The bight portions 53 are directed upwardly and outwardly, as shown in FIG. 6 and are provided with outwardly inclined top end portions 55 to facilitate engagement of the leg of a young fowl with the hook and to facilitate rapid disengagement of the fowl therefrom after treatment.

In operating the device, after a substantial quantity of poultry; for example, 200 to 250 pullets have been penned in the enclosure 12, workers in the enclosure begin catching and hanging pullets on the hooks 50 on the ring member 38 extending into the enclosure 12. The wheel member 38 is then rotated in a counter-clockwise direction, as viewed in FIG. 1, causing the pullets to be carried outside of the enclosure through the vertical slot portion 16. Other workers outside the enclosure perform the required treatment, such as debeaking and vaccination on each pullet. When the treatment outside of the enclosure is completed, the pullets are disengaged from the hook members 50 and are released as the wheel is turned, empty hooks arriving inside the enclosure 12 to be refilled.

As will be readily apparent from the above description, the poultry can be quickly and efficiently treated with a minimum amount of handling thereof required, since the poultry is carried on the wheel assembly during the various steps of treatment. The various treatment stations may be suitably located along the outer periphery of the ring member 38, so that the poultry can be moved from one station to another in rapid sequence and without the necessity of handling the poultry other than that required to perform the necessary treatment. Thus, the required operations, such as debeaking, vaccination, and the like, can be quickly and efficiently performed by a minimum number of workers.

While the specific embodiment of an improved device for treating live poultry has been disclosed in the foregoing description, it will be understood that various modifications within the spirit of the invention may occur to those skilled in the art. Therefore, it is intended that no limitations be placed on the invention excepted as defined by the scope of the appended claims.

What is claimed is:

1. A device for treating live poultry comprising a fenced enclosure, said enclosure including a panel formed with an inverted U-shaped slot, a horizontal wheel member, means rotatably supporting said wheel member at a location such that a peripheral portion thereof projects into the enclosure through said slot, and means on the periphery of said wheel member for detachably securing live poultry thereto, whereby live poultry may be conveyed from the interior of the enclosure through said slot for treatment externally of the enclosure, wherein the means for securing live poultry to the wheel member comprises spaced hook members secured to the periphery of the wheel member, and wherein said wheel member comprises a substantially circular ring element provided with a central hub portion having a vertical shaft and the means rotatably supporting said wheel member comprises a frame having a vertical bearing sleeve rotatably receiving said vertical shaft.

2. The poultry treatment device of claim 1, and means adjustably securing said bearing sleeve on said frame.

3. The poultry treatment device of claim 2, and wherein said wheel member is provided with a plurality of radial spoke elements connecting said ring element to said central hub portion.

4. The poultry treatment device of claim 3, and wherein said frame comprises a plurality of upwardly convergent leg elements and a flat plate member secured on and connecting the top ends of said leg elements, said plate member having a central aperture through which said bearing sleeve extends.

5. The poultry treatment device of claim 4, and wherein said means adjustably securing said bearing sleeve on said frame comprises a flange on said bearing sleeve, a plurality of spaced vertical upstanding bolts on said frame, and means adjustably securing said bolts to said flange.

6. The poultry treatment device of claim 5, and wherein said panel includes an inwardly projecting arcuate vertical portion subjacent said slot substantially concentric with but of smaller radius than said wheel member.

7. The poultry treatment device of claim 6, and wherein said hook members comprise respective hooks secured said ring element and depending therefrom and having outwardly directed substantially U-shaped bight portions.

8. The poultry treatment device of claim 7, and wherein said hooks are provided with resilient deformable protective cover sleeves.

* * * * *